United States Patent
Umino et al.

(10) Patent No.: US 12,221,170 B2
(45) Date of Patent: Feb. 11, 2025

(54) DEFLECTOR DEVICE

(71) Applicant: KABUSHIKI KAISHA TOKAI-RIKA-DENKI-SEISAKUSHO, Aichi-ken (JP)

(72) Inventors: Kazuya Umino, Aichi (JP); Kazuyuki Yokoyama, Aichi (JP); Nobuhiro Kudo, Aichi (JP); Shigeki Yoshida, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 112 days.

(21) Appl. No.: 17/896,371

(22) Filed: Aug. 26, 2022

(65) Prior Publication Data
US 2023/0065474 A1 Mar. 2, 2023

(30) Foreign Application Priority Data
Aug. 31, 2021 (JP) .................... 2021-141663

(51) Int. Cl.
*B62D 35/02* (2006.01)

(52) U.S. Cl.
CPC .................... *B62D 35/02* (2013.01)

(58) Field of Classification Search
CPC .... B62D 35/00; B62D 35/001; B62D 35/005; B62D 35/02
USPC ............................ 296/180.1, 180.3
See application file for complete search history.

(56) References Cited

U.S. PATENT DOCUMENTS

| | | | | |
|---|---|---|---|---|
| 9,950,754 | B2* | 4/2018 | Povinelli | B62D 35/02 |
| 9,956,998 | B2* | 5/2018 | Zielinski | B62D 35/02 |
| 10,081,400 | B2* | 9/2018 | Abdoul Azizou | B62D 35/02 |
| 10,953,933 | B2* | 3/2021 | Schmitt | B62D 35/005 |
| 10,981,611 | B2* | 4/2021 | Matthews | B62D 35/005 |
| 11,040,744 | B2* | 6/2021 | Shiga | B62D 35/02 |
| 11,155,312 | B2* | 10/2021 | Shiga | B62D 37/02 |
| 11,161,556 | B2* | 11/2021 | Zhang | B62D 37/02 |

(Continued)

FOREIGN PATENT DOCUMENTS

| | | |
|---|---|---|
| JP | H06227444 A | 8/1994 |
| JP | 2016094073 A | 5/2016 |

(Continued)

OTHER PUBLICATIONS

Japanese Notice of Reasons for Refusal (w/ Machine translation) for corresponding Application No. 2021-141663, mailed Nov. 12, 2024, 10 pages.

*Primary Examiner* — Jason S Daniels
(74) *Attorney, Agent, or Firm* — Dority & Manning, P.A.

(57) ABSTRACT

In a deflector device, when an external force acts on an deflector body while at a deployed position such that the deflector body is rotated in a stowing direction, even if further rotation of the deflector body in the stowing direction is restricted, the deflector body is rotated to the deployed position by an urging force of a torsion coil spring when the external force acting on the deflector body is released. This enables the deflector body to be rotated to the deployed position from anywhere over an entire rotatable range in the stowing direction by the urging force of the torsion coil spring. Thus, the torsion coil spring is able to rotate the deflector body to the deployed position in a suitable manner.

8 Claims, 6 Drawing Sheets

(56) References Cited

U.S. PATENT DOCUMENTS

| | | | |
|---|---|---|---|
| 11,623,701 B2* | 4/2023 | Tachi ................... | B62D 35/005 |
| | | | 296/180.1 |
| 2017/0101136 A1* | 4/2017 | Zielinski ................ | B62D 35/02 |
| 2019/0118872 A1* | 4/2019 | Shiga ..................... | B62D 37/02 |
| 2019/0152543 A1 | 5/2019 | Shiga et al. | |

FOREIGN PATENT DOCUMENTS

| | | |
|---|---|---|
| JP | 2019093785 | 6/2019 |
| JP | 2020090278 A | 6/2020 |

\* cited by examiner

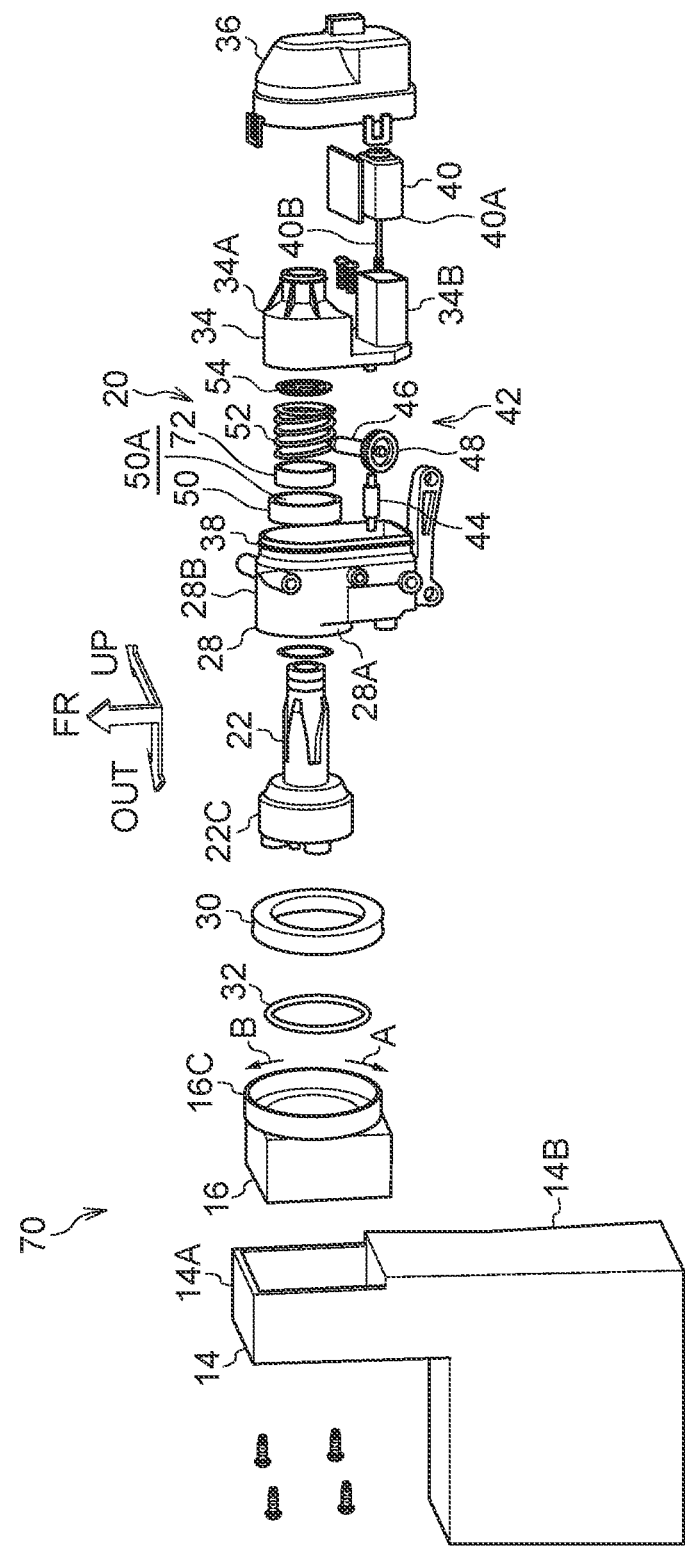

DEFLECTOR DEVICE

CROSS-REFERENCE TO RELATED APPLICATION

This application is based on and claims priority under 35 USC 119 from Japanese Patent Application No. 2021-141663 filed on Aug. 31, 2021, the disclosure of which is incorporated by reference herein.

BACKGROUND

Technical Field

The present invention relates to a deflector device that suppresses airflow from flowing toward a front wheel of a vehicle.

Related Art

In a vehicle deflector device disclosed in Japanese Patent Application Laid-Open (JP-A) No. 2019-93785, a protrusion (pressed portion) of a second collar member on a drive device side is inserted into a recess of a first collar member on a deflector member side by urging force of a spring. When the drive device is driven, the second collar member and the first collar member are rotated, such that the deflector member is rotated. If an external force acts on the deflector member, the first collar member is rotated relative to the second collar member (vehicle body side) against the urging force of the spring, such that rotation of the deflector member is permitted.

Note that in this vehicle deflector device, when an external force acts on the deflector member such that the first collar member is rotated relative to the second collar member, in cases in which the protrusion of the second collar member comes out from the recess in the first collar member, the spring is unable to reinsert the protrusion of the second collar member back into the recess in the first collar member. Thus, the spring cannot cause the first collar member to rotate relative to the second collar member, and the deflector member cannot be made to rotate.

SUMMARY

In consideration of the above circumstances, an object of the present invention is to obtain a deflector device in which an urging mechanism is capable of coupling a deflector body to a vehicle body side in a suitable manner when the coupling of the deflector body to the vehicle body side has been released.

A deflector device of a first aspect of the present invention includes a deflector body configured to be deployed at a front side of a front wheel of a vehicle by being rotated in a deployment direction so as to suppress airflow toward the front wheel, and configured to be stowed in a vehicle body by being rotated in a stowing direction, a rotating mechanism configured to cause the deflector body to rotate due to the deflector body being coupled to a vehicle body side, and configured to permit rotation of the deflector body in the stowing direction due to an external force acting on the deflector body so as to release coupling of the deflector body to the vehicle body side; and an urging mechanism configured to couple the deflector body to the vehicle body side from anywhere over an entire rotatable range of the deflector body in the stowing direction by urging the deflector body in the deployment direction when the coupling of the deflector body to the vehicle body side has been released.

In the deflector device of the first aspect of the present invention, the deflector body is rotated in the deployment direction to be deployed at the front side of the front wheel of the vehicle such that airflow toward the front wheel is suppressed. Furthermore, the deflector body is rotated in the stowing direction to be stowed in the vehicle body.

Moreover, the rotating mechanism causes the deflector body to rotate due to the deflector body being coupled to the vehicle body side. Furthermore, rotation of the deflector body in the stowing direction is permitted due to an external force acting on the deflector body so as to release the coupling of the deflector body to the vehicle body side.

Note that the urging mechanism is configured to couple the deflector body to the vehicle body side from anywhere over the entire rotatable range of the deflector body in the stowing direction by urging the deflector body in the deployment direction when the coupling of the deflector body to the vehicle body side has been released. The urging mechanism is therefore able to couple the deflector body to the vehicle body side in a suitable manner.

A deflector device of a second aspect of the present invention is the deflector device of the first aspect of the present invention, wherein the deflector body is rotatable from a deployed position to a position further in the stowing direction than a stowed position.

In the deflector device of the second aspect of the present invention, the deflector body is rotatable from the deployed position to a position further in the stowing direction than the stowed position. Thus, when the deflector body has rotated from the deployed position and the coupling to the vehicle body side has been released, the urging mechanism is able to recouple the deflector body from the position further toward the stowing direction side than the stowed position.

A deflector device of a third aspect of the present invention is the deflector device of the first aspect or the second aspect of the present invention, further including an urging section configured to urge between a deflector body side and the vehicle body side so as to limit movement of the deflector body with respect to the vehicle body side.

In the deflector device of the third aspect of the present invention, the urging section urges between the deflector body side and the vehicle body side so as to limit movement of the deflector body with respect to the vehicle body side. This enables rattling of the deflector body against the vehicle body side to be suppressed.

A deflector device of a fourth aspect of the present invention is the deflector device of any one of the first aspect to the third aspect of the present invention, further including a first restricting section that is provided at a rotation shaft of the deflector body, and is configured to restrict rotation of the deflector body by the rotating mechanism.

In the deflector device of the fourth aspect of the present invention, the first restricting section restricts rotation of the deflector body by the rotating mechanism. Note that the first restricting section is provided at the rotation shaft of the deflector body. This enables the degrees of freedom for the configuration of the periphery of the rotation shaft to be increased.

A deflector device of a fifth aspect of the present invention is the deflector device of any one of the first aspect to the fourth aspect of the present invention, further including a second restricting section that is provided at a rotation shaft of the deflector body, and is configured to restrict rotation of the deflector body by releasing the coupling of the deflector body to the vehicle body side.

In the deflector device of the fifth aspect of the present invention, the second restricting section restricts rotation of the deflector body by releasing the coupling of the deflector body to the vehicle body side. Note that the second restricting section is provided at the rotation shaft of the deflector body. This enables the degrees of freedom for the configuration of the periphery of the rotation shaft to be increased.

A deflector device of a sixth aspect of the present invention is the deflector device of any one of the first aspect to the fifth aspect of the present invention, further including a seal section configured to seal between ae deflector body side and the vehicle body side.

In the deflector device of the sixth aspect of the present invention, the seal section seals between the deflector body side and the vehicle body side. This enables water ingress into the rotating mechanism side from the deflector body side to be suppressed.

BRIEF DESCRIPTION OF THE DRAWINGS

Exemplary embodiments of the present invention will be described in detail based on the following figures, wherein:

FIG. 5 is an exploded perspective view illustrating a deflector device according to a second exemplary embodiment of the present invention, as viewed from the vehicle width direction inside and lower side;

DETAILED DESCRIPTION

First Exemplary Embodiment

Figure 1:
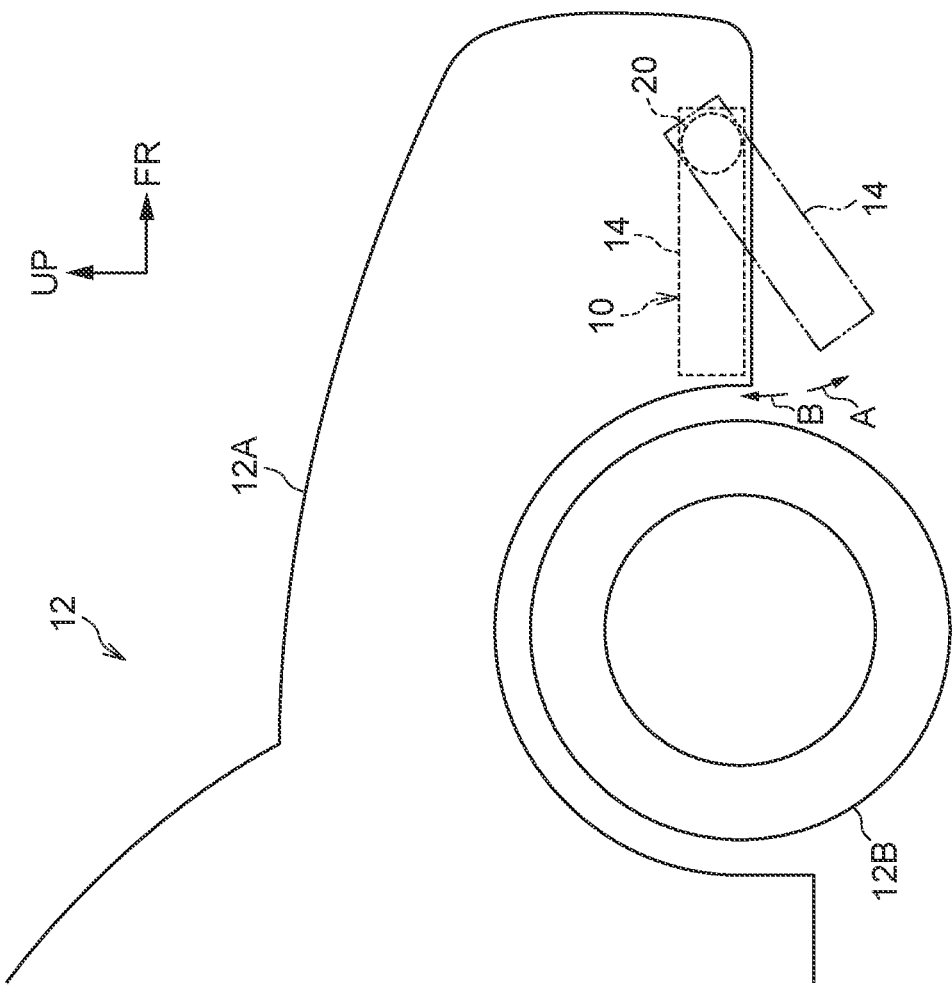
FIG. 1 is a side view illustrating a front section of a vehicle of a first exemplary embodiment of the present invention, as viewed from a vehicle width direction outside.
Figure 2:
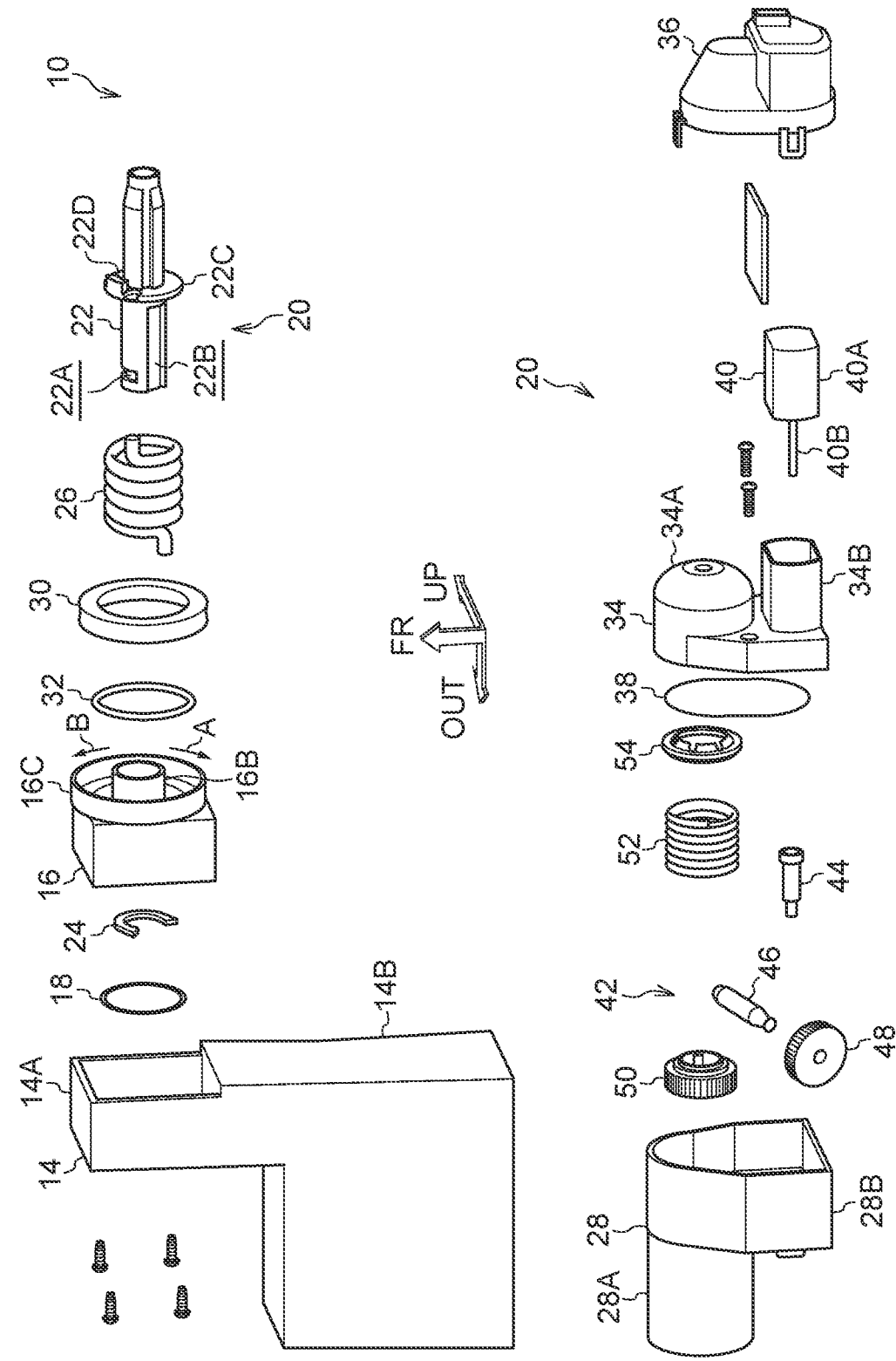
FIG. 2 is an exploded perspective view illustrating a deflector device according to the first exemplary embodiment of the present invention, as viewed from a vehicle width direction inside and lower side.
Figure 3:
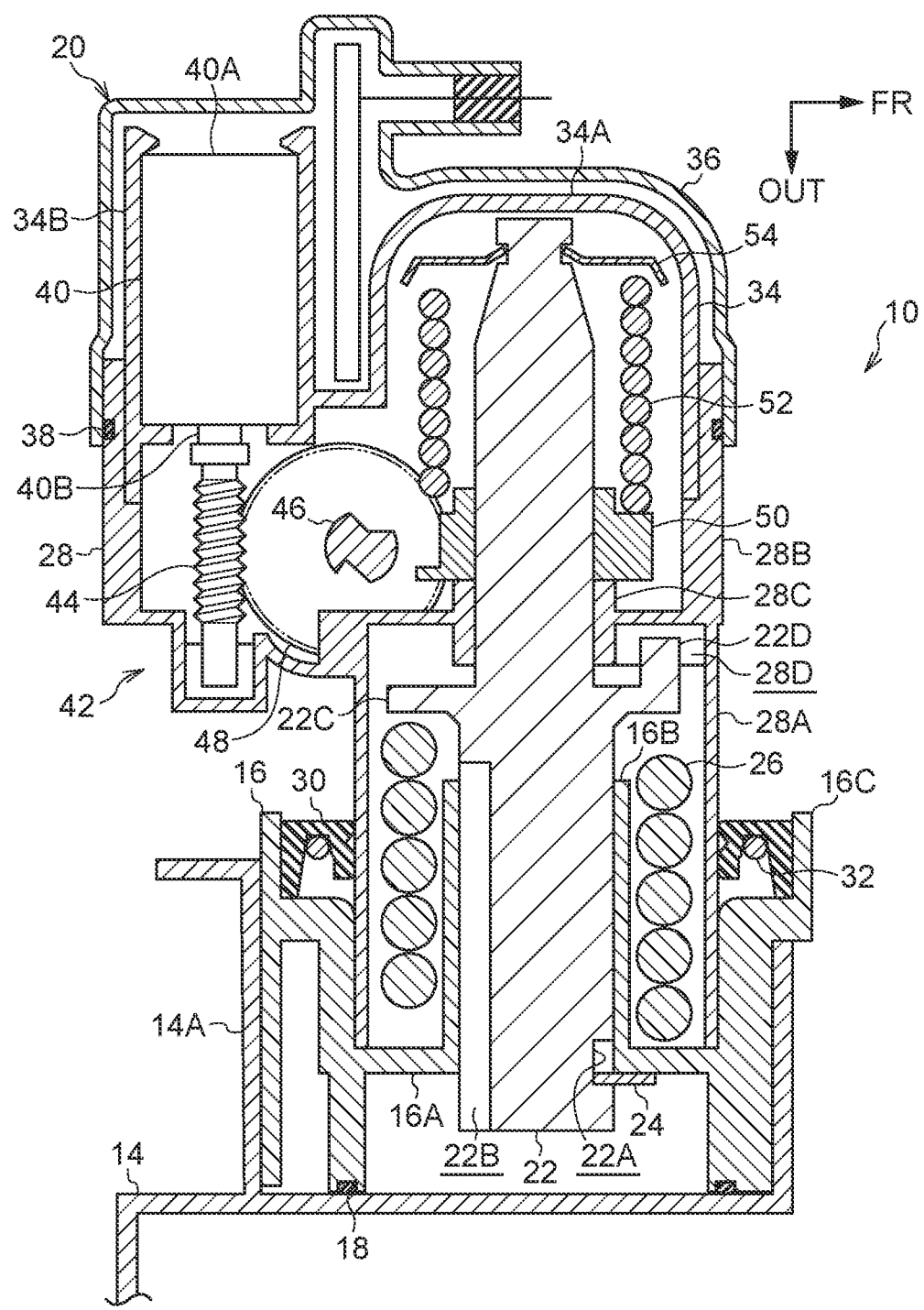
FIG. 3 is a cross-section illustrating the deflector device according to the first exemplary embodiment of the present invention, as viewed from an upper side.

FIG. 1 is a side view illustrating a front section of a vehicle 12 of a first exemplary embodiment of the present invention, as viewed from a vehicle width direction outside (vehicle right side). FIG. 2 is an exploded perspective view illustrating a deflector device 10 according to the present exemplary embodiment, as viewed from a vehicle width direction inside and lower side. FIG. 3 is a cross-section illustrating the deflector device 10 as viewed from an upper side. Note that in the drawings, the arrow FR indicates a vehicle front side, the arrow OUT indicates the vehicle width direction outside (vehicle right side), and the arrow UP indicates the upper side.

As illustrated in FIG. 1, the deflector device 10 according to the present exemplary embodiment is installed inside a front end section of a vehicle body 12A, and is disposed at the front side of a front wheel 12B of the vehicle 12.

As illustrated in FIG. 2 and FIG. 3, a deflector body 14 (wheel spats) made of resin is provided to the deflector device 10. The deflector body 14 is disposed at a stowed position (the dashed-line position in FIG. 1). A vehicle front side end portion of the deflector body 14 configures a substantially rectangular box-shaped assembly box 14A, serving as an assembly section. The inside of the assembly box 14A is open toward the vehicle width direction inside. A section of the deflector body 14 further toward a vehicle rear side than the assembly box 14A configures a substantially rectangular box-shaped deflector section 14B. A vehicle width direction inside end portion of the deflector section 14B is integral to the assembly box 14A, and the interior of the deflector section 14B is open toward the upper side and vehicle rear side.

An attachment 16 that has a substantially rectangular tubular external shape, is made of resin, and serves as an assembly member is fitted inside the assembly box 14A. A peripheral wall of the attachment 16 is fixed to a bottom wall (vehicle width direction outside wall) of the assembly box 14A. The inside of the attachment 16 has a substantially circular column shape, and the inside of the attachment 16 is open toward both vehicle width direction sides. An annular plate-shaped partitioning wall 16A is integrally formed inside the attachment 16. The partitioning wall 16A partitions the inside of the attachment 16 into a vehicle width direction outside section and a vehicle width direction inside section.

Figure 4A:
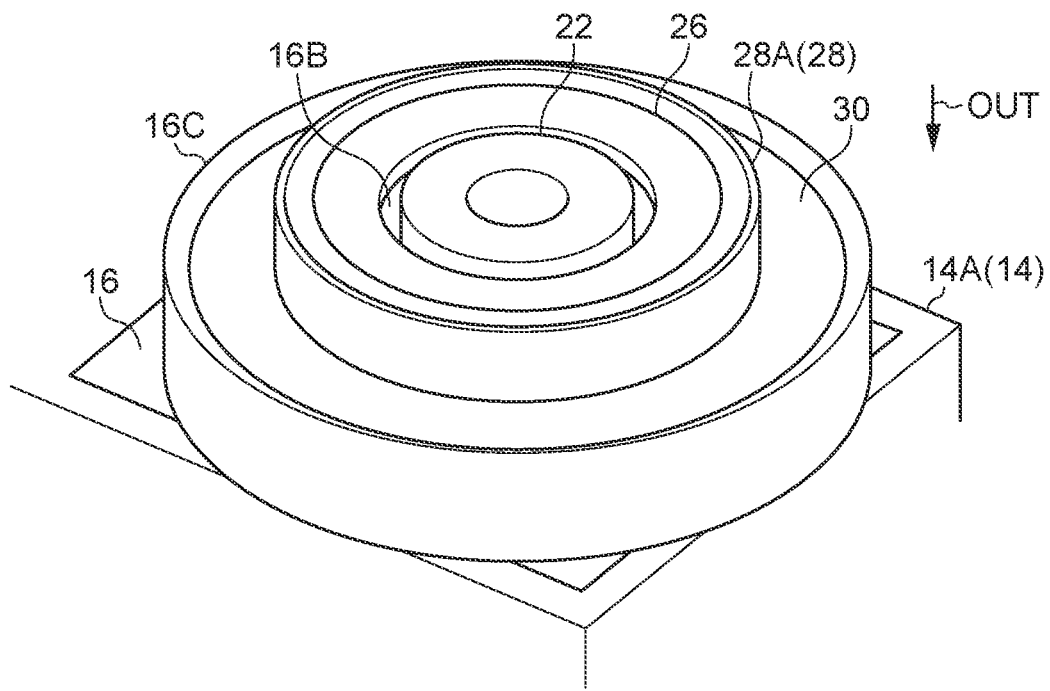
FIG. 4A is a perspective view illustrating the periphery of a vehicle width direction intermediate portion of a stand of the deflector device according to the first exemplary embodiment of the present invention, as viewed from the vehicle width direction inside.
Figure 4B:
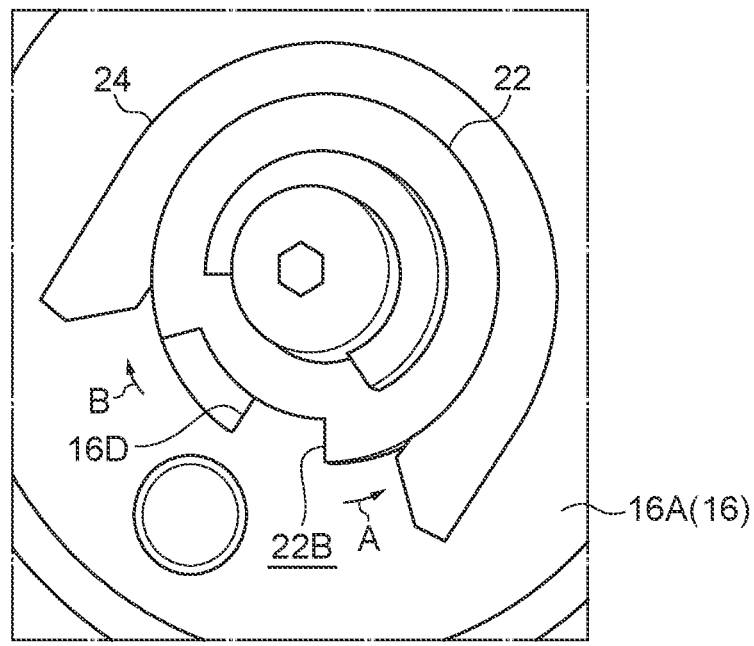
FIG. 4B is a perspective view illustrating the periphery of a vehicle width direction outside portion of the stand of the deflector device according to the first exemplary embodiment of the present invention, as viewed from the vehicle width direction outside.

A circular tube-shaped rotating tube 16B is coaxially and integrally formed to a radial direction inside portion of the partitioning wall 16A. The rotating tube 16B projects toward the vehicle width direction inside from the partitioning wall 16A, and projects toward the vehicle width direction inside from the attachment 16. A circular tube-shaped sealing tube 16C is integrally formed at the vehicle width direction inside of the attachment 16. The sealing tube 16C projects toward the vehicle width direction inside, is disposed at the vehicle width direction inside of the assembly box 14A, and is disposed coaxially to the rotating tube 16B. A substantially rectangular column-shaped restricting column 16D (see FIG. 4B), serving as a restricted section, is integrally formed to an inner circumferential face of the rotating tube 16B. The restricting column 16D projects toward the radial direction inside of the rotating tube 16B, and is curved about a circumferential direction of the rotating tube 16B.

An annular-shaped first ring 18, made of rubber and serving as a first seal, is clamped between the bottom wall of the assembly box 14A and the peripheral wall of the attachment 16. The first ring 18 is elastically compressed. The first ring 18 seals between the bottom wall of the assembly box 14A and the peripheral wall of the attachment 16, such that the first ring 18 limits water ingress into the attachment 16.

A drive device 20 is assembled to the attachment 16. The drive device 20 is fixed inside the front end section of the vehicle body 12A.

A substantially circular column-shaped stand 22 (vehicle body 12A side), made of metal and serving as a rotation shaft, is provided to the drive device 20. A vehicle width direction outside portion of the stand 22 penetrates and is fitted inside the rotating tube 16B of the attachment 16. The attachment 16 and the deflector body 14 are thereby capable of rotating in a deployment direction A and a stowing direction B with the stand 22 as a central shaft. An anchor groove 22A with a rectangular cross-section profile is formed in an outer circumferential face of a vehicle width direction outside end portion of the stand 22. The anchor groove 22A extends around more than half of a circumferential direction of the stand 22. A C-plate shaped C ring 24, made of metal and serving as an anchor member, is fitted and fixed to the vehicle width direction outside end portion of the stand 22. The C ring 24 is inserted into the anchor groove 22A. The C ring 24 abuts a vehicle width direction outside end face of the anchor groove 22A, and also abuts a vehicle width direction outside face of the partitioning wall 16A of the attachment 16, such that the C ring 24 anchors the stand 22 against movement toward the vehicle width direction inside.

A restricting groove 22B, with an elongated rectangular cross-section profile and serving as a second restricting section, is formed in an outer circumferential face of the vehicle width direction outside portion of the stand 22. The restricting groove 22B extends about the circumferential direction of the stand 22 at a different circumferential direction position than the anchor groove 22A and the C ring 24 in the stand 22. The restricting groove 22B is open toward the vehicle width direction outside, and the restricting column 16D of the attachment 16 is inserted into the restricting groove 22B (see FIG. 4B). Rotation of the attachment 16 and the deflector body 14 in the deployment direction A is thereby restricted when the restricting column 16D abuts a deployment direction A-side end face of the restricting groove 22B. Similarly, rotation of the attachment 16 and the deflector body 14 in the stowing direction B is restricted when the restricting column 16D abuts a stowing direction B-side end face of the restricting groove 22B.

An annular plate-shaped flange 22C, serving as an enlarged diameter section, is coaxially and integrally formed to a vehicle width direction intermediate portion of the stand 22. A substantially rectangular plate-shaped restricting plate 22D, serving as a first restricting section, is integrally formed to the flange 22C. The restricting plate 22D projects toward the vehicle width direction inside, and is curved about the circumferential direction of the flange 22C.

The vehicle width direction outside portion of the stand 22 and the rotating tube 16B of the attachment 16 are inserted inside a torsion coil spring 26 that is made of metal and serves as an urging mechanism. A vehicle width direction inside end portion of the torsion coil spring 26 penetrates and is anchored to the flange 22C of the stand 22. A vehicle width direction outside end portion of the torsion coil spring 26 penetrates and is anchored to the partitioning wall 16A of the attachment 16. The torsion coil spring 26 is twisted around the circumferential direction, and urges the attachment 16 and the deflector body 14 in the deployment direction A so as to cause the restricting column 16D of the attachment 16 to abut the deployment direction A-side end face of the restricting groove 22B in the stand 22 (see FIG. 4B).

A case 28, made of resin and serving as a support body, is provided at the vehicle width direction inside of the attachment 16. A circular tube-shaped support tube 28A is provided at a vehicle width direction outside portion of the case 28. The support tube 28A is fitted inside the attachment 16, such that the case 28 rotatably supports the attachment 16, and the stand 22 (including the flange 22C) and the torsion coil spring 26 are coaxially housed inside the support tube 28A.

A substantially rectangular box-shaped case body 28B is integrally formed at the vehicle width direction inside of the support tube 28A. The case body 28B projects toward the vehicle rear side from the support tube 28A, and the interior of the case body 28B is open toward the vehicle width direction inside. A circular tube-shaped abutting tube 28C is integrally formed to a bottom wall (vehicle width direction outside wall) of the case body 28B. The abutting tube 28C is disposed coaxially to the support tube 28A and projects toward the vehicle width direction inside. The inside of the abutting tube 28C is in communication with the inside of the support tube 28A. The stand 22 penetrates and is fitted inside the abutting tube 28C.

A restricting hole 28D, with a rectangular cross-section profile and serving as a restricting section, is formed in a vehicle width direction outside face of the bottom wall of the case body 28B located at the radial direction outside of the abutting tube 28C. The restricting hole 28D extends about the circumferential direction of the abutting tube 28C. The restricting plate 22D of the stand 22 (flange 22C) is inserted into the restricting hole 28D. Rotation of the stand 22 in the stowing direction B is restricted due to the restricting plate 22D abutting a stowing direction B-side end face of the restricting hole 28D. Rotation of the stand 22 in the deployment direction A is restricted when the restricting plate 22D abut a deployment direction A-side end face of the restricting hole 28D.

An annular-shaped sealing ring 30, made of rubber and serving as a seal section, is provided between the sealing tube 16C of the attachment 16 and the support tube 28A of the case 28. The sealing ring 30 has a substantially U-shaped cross-section profile, and its interior is open toward the vehicle width direction outside. An annular-shaped enlarging ring 32 made of metal is inserted inside the sealing ring 30. The enlarging ring 32 enlarges a dimension (width dimension) of the sealing ring 30 in its radial direction. The sealing ring 30 is clamped and elastically compressed between the sealing tube 16C and the support tube 28A, such that the sealing ring 30 seals between the sealing tube 16C and the support tube 28A and limits water ingress into the support tube 28A (see FIG. 4A).

A motor base 34, made of resin and serving as a retaining member, is fixed inside a vehicle width direction inside portion of the case body 28B. A bottomed, substantially circular tube-shaped housing tube 34A is formed at a vehicle front side portion of the motor base 34. The inside of the housing tube 34A is open toward the vehicle width direction outside, and the stand 22 is coaxially housed therein. A bottomed, substantially elliptical tube-shaped retaining tube 34B is integrally formed to a vehicle rear side portion of the motor base 34. The inside of the retaining tube 34B is open toward the vehicle width direction inside.

A substantially rectangular box-shaped cover 36, made of resin and serving as a covering member, is provided at the vehicle width direction inside of the case body 28B and the motor base 34. The inside of the cover 36 is open toward the vehicle width direction outside. A vehicle width direction inside end portion of the case body 28B is fitted and fixed inside a vehicle width direction outside end portion of the cover 36, such that the cover 36 covers the vehicle width direction insides of the case body 28B and the motor base 34.

An annular-shaped second ring 38, made of rubber and serving as a second seal, is clamped between the vehicle width direction inside end portion of the case body 28B and the vehicle width direction outside end portion of the cover 36. The second ring 38 is elastically compressed. The second ring 38 seals between the vehicle width direction inside end portion of the case body 28B and the vehicle width direction outside end portion of the cover 36, such that the second ring 38 limits water ingress into a space between the case body 28B and the cover 36.

The case body 28B and the cover 36 are fixed inside the front end section of the vehicle body 12A, such that the drive device 20 is also fixed inside the front end section of the vehicle body 12A.

A motor 40, serving as a rotating mechanism, is provided in the space between the case body 28B and the cover 36. A substantially elliptical column-shaped main body 40A is provided to the motor 40. The main body 40A is fitted into the retaining tube 34B of the motor base 34 from the vehicle width direction inside and retained thereby. An output shaft 40B extends toward the vehicle width direction outside from the main body 40A. The output shaft 40B penetrates a bottom wall (vehicle width direction outside wall) of the retaining tube 34B and extends toward the vehicle width direction outside of the motor base 34. The output shaft 40B is rotated when the motor 40 is driven.

A gear mechanism 42 is provided inside the case body 28B.

An initial-stage worm 44 made of resin is provided to the gear mechanism 42 so as to be located at the vehicle width direction outside of the motor 40. A vehicle width direction outside end portion of the initial-stage worm 44 is supported by the bottom wall of the case body 28B so as to able to rotate. The output shaft 40B of the motor 40 is coaxially inserted into the initial-stage worm 44 from the vehicle width direction inside, such that the initial-stage worm 44 is rotated integrally with the output shaft 40B when the output shaft 40B is rotated.

An output worm 46 made of metal is provided to the gear mechanism 42 so as to be located at the upper side of the initial-stage worm 44. The output worm 46 is supported so as to able to rotate between the bottom wall of the case body 28B and the motor base 34. An initial-stage gear 48 (worm wheel) made of resin is coaxially supported at the lower side of the output worm 46. The initial-stage gear 48 is rotated integrally to the output worm 46. The initial-stage gear 48 is meshed with the initial-stage worm 44, such that when the initial-stage worm 44 is rotated, the initial-stage gear 48 and the output worm 46 are rotated integrally thereto.

An output gear 50 (worm wheel) made of metal is provided to the gear mechanism 42 so as to be located at the vehicle front side of the output worm 46. A vehicle width direction inside portion of the stand 22 coaxially penetrates the output gear 50, such that output gear 50 is rotated integrally to the stand 22. The output gear 50 is capable of moving in the vehicle width direction (axial direction) relative to the stand 22. The output gear 50 abuts the abutting tube 28C of the case body 28B from the vehicle width direction inside. The output gear 50 is meshed with the output worm 46 such that its rotation is limited. When the output worm 46 is rotated, and the output gear 50 and the stand 22 are rotated integrally thereto.

The vehicle width direction inside portion of the stand 22 is coaxially inserted inside a compression coil spring 52 that is made of metal and serves as an urging section. A substantially annular plate-shaped push nut 54, made of metal and serving as an engaging member, is fitted and fixed to a vehicle width direction inside end portion of the stand 22. The compression coil spring 52 spans between the push nut 54 and the output gear 50. The compression coil spring 52 is compressed in its axial direction, such that the compression coil spring 52 urges the push nut 54 and the stand 22 toward the vehicle width direction inside.

Next, explanation follows regarding operation of the present exemplary embodiment.

In the deflector device 10 with the above configuration, the torsion coil spring 26 urges the attachment 16 and the deflector body 14 in the deployment direction A. This causes the restricting column 16D of the attachment 16 to abut the deployment direction A-side end face of the restricting groove 22B in the stand 22 of the drive device 20 (see FIG. 4B), such that the deflector body 14 and the attachment 16 are coupled to the drive device 20 (including the motor 40).

When the motor 40 of the drive device 20 is driven forward, the output shaft 40B, the initial-stage worm 44, the initial-stage gear 48, and the output worm 46 are rotated, such that the output gear 50, the stand 22, the torsion coil spring 26, and the attachment 16 are rotated in the deployment direction A, and the deflector body 14 is rotated in the deployment direction A. As a result, the restricting plate 22D of the stand 22 (flange 22C) abuts the deployment direction A-side end face of the restricting hole 28D in the case body 28B, such that rotation of the stand 22 in the deployment direction A is restricted. Further rotation of the deflector body 14 in the deployment direction A is thereby restricted, and the deflector body 14 is disposed at a deployed position (the double-dotted dashed line position in FIG. 1). Thus, the deflector section 14B of the deflector body 14 is disposed at the vehicle front side of the front wheel 12B of the vehicle 12 located at the lower side of the vehicle body 12A, such that wind (airflow) traveling along the vehicle 12 toward the front wheel 12B is suppressed (the wind is made to flow at the lower side of the front wheel 12B). An increase in air pressure at the vehicle front side of the front wheel 12B is thereby suppressed, and aerodynamic drag and lift of the vehicle 12 are suppressed.

On the other hand, when the motor 40 of the drive device 20 is driven in reverse, the output shaft 40B, the initial-stage worm 44, the initial-stage gear 48, and the output worm 46 are rotated, such that the output gear 50, the stand 22, the torsion coil spring 26, and the attachment 16 are rotated in the stowing direction B, and the deflector body 14 is rotated in the stowing direction B. As a result, the restricting plate 22D of the stand 22 (flange 22C) abuts the stowing direction B-side end face of the restricting hole 28D in the case body 28B, such that rotation of the stand 22 in the stowing direction B is restricted. Further rotation of the deflector body 14 in the stowing direction B is thereby restricted, and the deflector body 14 is disposed at the stowed position (the dashed line position in FIG. 1).

When the deflector body 14 is disposed at the deployed position, if an external force toward the upper side of a predetermined value or greater acts on the deflector section 14B of the deflector body 14 due to a protrusion on the road surface where the vehicle 12 is traveling, the deflector body 14 and the attachment 16 are rotated in the stowing direction B against the urging force of the torsion coil spring 26 (the coupling of the deflector body 14 and the attachment 16 to the drive device 20 is released). The deflector body 14, the attachment 16, and the drive device 20 are thereby protected. As a result, the restricting column 16D of the attachment 16 abuts the stowing direction B-side end face of the restricting groove 22B in the stand 22, such that further rotation of the deflector body 14 and the attachment 16 in the stowing direction B is restricted.

Note that when such an external force acts on the deflector body 14 while at the deployed position such that the deflector body 14 is rotated in the stowing direction B against the urging force of the torsion coil spring 26 as described above, even if the restricting column 16D of the attachment 16 abuts the stowing direction B-side end face of the restricting groove 22B in the stand 22 such that further rotation of the deflector body 14 in the stowing direction B is restricted, the deflector body 14 is rotated in the deployment direction A by the urging force of the torsion coil spring 26 when the external force acting on the deflector body 14 is released. The restricting column 16D thereby abuts the deployment direction A-side end face of the restricting groove 22B (the deflector body 14 is coupled to the drive device 20). This enables the deflector body 14 to be rotated (returned) to the deployed position (the position where the restricting column 16D abuts the deployment direction A-side end face of the restricting groove 22B) from anywhere over the entire rotatable range in the stowing direction B by the urging force of the torsion coil spring 26. Thus, the torsion coil spring 26 is able to rotate the deflector body 14 to the deployed position (able to cause the deflector body 14 to couple to the drive device 20) in a suitable manner.

Furthermore, when an external force acts on the deflector body 14 while at the deployed position such that the deflector body 14 is rotated in the stowing direction B against the urging force of the torsion coil spring 26, the deflector body 14 is rotated further toward the stowing direction B side (upper side) than the stowed position, and the restricting column 16D of the attachment 16 abuts the stowing direction B-side end face of the restricting groove 22B in the stand 22. This enables the deflector body 14 to be rotated (returned) to the deployed position from its position further toward the stowing direction B side than the stowed position by the urging force of the torsion coil spring 26 when the external force acting on the deflector body 14 is released.

Moreover, the torsion coil spring 26 is disposed between the partitioning wall 16A of the attachment 16 and the flange 22C of the stand 22, such that even when the deflector body 14 is rotated from the deployed position to the position where the restricting column 16D of the attachment 16 abuts the stowing direction B-side end face of the restricting groove 22B in the stand 22 and the torsion coil spring 26 is twisted in the circumferential direction, the partitioning wall 16A and the flange 22C do not restrict expansion of the torsion coil spring 26 in the vehicle width direction (axial direction). This enables any restriction on expansion of the torsion coil spring 26 in the vehicle width direction to be suppressed, and also enables any restriction on twisting of the torsion coil spring 26 in the circumferential direction to be suppressed.

Furthermore, in the drive device 20, the compression coil spring 52 spans between the push nut 54 and the output gear 50 of the stand 22, the compression coil spring 52 urges the stand 22 toward the vehicle width direction inside, and the C ring 24 of the stand 22 abuts the vehicle width direction outside face of the partitioning wall 16A of the attachment 16 such that the stand 22 is anchored against movement toward the vehicle width direction inside. This enables movement of the deflector body 14 and the attachment 16 in the vehicle width direction relative to the drive device 20 (including the motor 40) to be limited, and enables rattling of the deflector body 14 against the drive device 20 to be suppressed.

Moreover, the restricting plate 22D of the stand 22 (flange 22C) abuts either of the end faces of the restricting hole 28D in the case body 28B such that rotation of the deflector body 14 (stand 22) by the drive device 20 is restricted. Note that providing the restricting plate 22D to the flange 22C of the stand 22 enables the degrees of freedom for the configuration of the periphery of the stand 22 (flange 22C) to be increased.

Furthermore, rotation of the deflector body 14 by the urging force of the torsion coil spring 26 and against the urging force of the torsion coil spring 26 is restricted due to the restricting column 16D of the attachment 16 abutting the corresponding end face of the restricting groove 22B in the stand 22. Note that providing the restricting groove 22B in the stand 22 enables the degrees of freedom for the configuration of the periphery of the stand 22 to be increased.

Furthermore, the restricting groove 22B is provided in the stand 22 at a different circumferential direction position than the anchor groove 22A and the C ring 24. This enables the restricting groove 22B to be provided in the stand 22, even in cases in which the anchor groove 22A and the C ring 24 are also provided to the stand 22.

Moreover, the sealing ring 30 seals between the sealing tube 16C of the attachment 16 and the support tube 28A of the case 28 so as to limit water ingress into the support tube 28A. This enables water ingress into the case 28 to be limited, and also enables water ingress into the motor 40 located between the case 28 and the cover 36 to be limited.

Furthermore, the first ring 18 seals between the bottom wall of the assembly box 14A of the deflector body 14 and the circumferential wall of the attachment 16 so as to limit water ingress into the attachment 16. This enables water ingress into the rotating tube 16B of the attachment 16 to be limited, and also enables water ingress into the motor 40 located between the case 28 and the cover 36 to be limited.

Furthermore, the second ring 38 seals between a vehicle width direction inside end portion of the case body 28B and the vehicle width direction outside end portion of the cover 36 so as to limit water ingress into the space between the case 28 and the cover 36. This enables water ingress into the motor 40 located between the case 28 and the cover 36 to be limited.

Second Exemplary Embodiment

FIG. 5 is an exploded perspective view illustrating a deflector device 70 according to a second exemplary embodiment of the present invention, as viewed from the vehicle width direction inside and lower side.

The deflector device 70 according to the present exemplary embodiment has basically the same configuration as that of the first exemplary embodiment, but differs in the following points.

As illustrated in FIG. 5, in the deflector device 70 according to the present exemplary embodiment, the rotating tube 16B of the first exemplary embodiment is not formed to the partitioning wall 16A inside the attachment 16, and instead the partitioning wall 16A blocks between the vehicle width direction outside portion and the vehicle width direction inside portion inside the attachment 16. Moreover, the first ring 18 of the first exemplary embodiment is not provided between the bottom wall of the assembly box 14A of the deflector body 14 and the circumferential wall of the attachment 16.

In this drive device 20, the vehicle width direction (axial direction) dimension of the flange 22C of the stand 22 is enlarged, and the stand 22 is not provided with a portion further toward the vehicle width direction outside than the flange 22C. Moreover, the C ring 24 and the torsion coil spring 26 of the first exemplary embodiment are not provided. The flange 22C is fitted inside the attachment 16, and is fixed to the partitioning wall 16A of the attachment 16 such that the attachment 16 and the deflector body 14 are capable of rotating in the deployment direction A and the stowing direction B integrally to the stand 22 with the stand 22 as a central shaft. Moreover, rotation of the deflector body 14 is restricted inside the front end section of the vehicle body 12A, such that a rotatable range of the deflector body 14 is set to a range between the deployed position and a position further toward the stowing direction B side (upper side) than the stowed position.

In the case 28, the vehicle width direction (axial direction) dimension of the support tube 28A has been reduced, and the flange 22C of the stand 22 is anchored against movement toward the vehicle width direction inside by the bottom wall (vehicle width direction outside wall) of the case body 28B of the case 28. The stowing direction B-side end face of the restricting hole 28D in the bottom wall of the case body 28B is inclined in a direction toward the vehicle width direction outside on progression about the stowing direction B, such that the restricting plate 22D of the flange 22C is capable of riding over the stowing direction B-side end face of the restricting hole 28D and rotating in the stowing direction B as a result of rotation of the stand 22 at a predetermined load or greater.

Figure 6A:
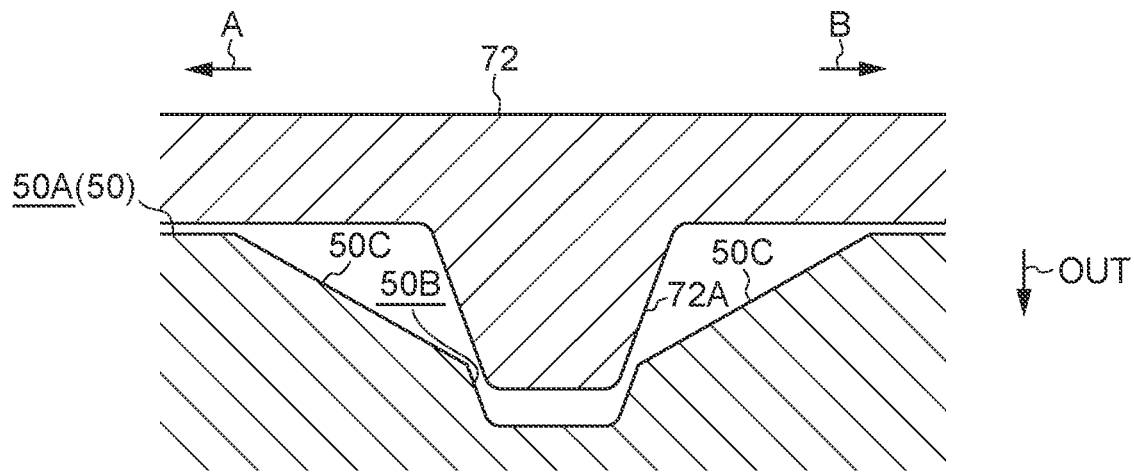
FIG. 6A is a cross-section illustrating a coupling mechanism of the deflector device according to the second exemplary embodiment of the present invention in a coupled state.

In the gear mechanism 42 inside the case body 28B, the output gear 50 (vehicle body 12A side), serving as a coupling section configuring a coupling mechanism, is rotatably supported by the stand 22, and the output gear 50 and the deflector body 14 are capable of rotating relative to one another. A circular tube-shaped recess 50A is coaxially formed in a vehicle width direction inside face of the output gear 50. The recess 50A is open toward the vehicle width direction inside. Plural (four in the present exemplary embodiment) coupling recesses 50B (see FIG. 6A), serving as coupled locations, are formed in a vehicle width direction outside face of the recess 50A. The plural coupling recesses 50B are arranged at uniform spacings around a circumferential direction of the output gear 50. Each of the coupling recesses 50B has an inverted trapezoidal cross-section profile, with both side faces of the coupling recess 50B inclined in a direction toward the vehicle width direction inside on progression toward the output gear 50—circumferential direction outside of the coupling recess 50B. Release faces 50C, serving as release portions, are formed in the vehicle width direction outside face of the recess 50A so as to be located on both output gear 50—circumferential direction outer sides of each of the coupling recesses 50B. The release faces 50C are inclined in a direction toward the vehicle width direction inside on progression toward the output gear 50—circumferential direction outside of the corresponding coupling recess 50B. An angle of inclination of the release faces 50C with respect to the output gear 50—circumferential direction is set smaller than an angle of inclination of side faces of the coupling recesses 50B with respect to the output gear 50—circumferential direction.

A substantially circular tube-shaped clutch 72, made of metal and serving as a coupling member configuring the coupling mechanism, is provided at the vehicle width direction inside of the output gear 50. The stand 22 coaxially penetrates the clutch 72 such that the clutch 72 is supported by the stand 22 so as to be incapable of rotating relatively thereto. The clutch 72 is capable of moving in the vehicle width direction relative to the stand 22, and is fitted inside the recesses 50A in the output gear 50.

Plural (four in the present exemplary embodiment) coupling protrusions 72A (see FIG. 6A), serving as engaging locations, are formed in a vehicle width direction outside face of the clutch 72. The plural coupling protrusions 72A are arranged at uniform spacings around a circumferential direction of the clutch 72. Each of the coupling protrusions 72A has an inverted trapezoidal cross-section profile, with both side faces of the coupling protrusion 72A inclined in a direction toward the vehicle width direction outside on progression toward the clutch 72—circumferential direction inside of the coupling protrusion 72A. The coupling protrusions 72A are inserted into the coupling recesses 50B in the output gear 50, such that the coupling protrusions 72A and the coupling recesses 50B fitted together in the circumferential directions of the output gear 50 and the clutch 72.

The compression coil spring 52, serving as an urging mechanism and an urging section, spans between the clutch 72 and the push nut 54 of the stand 22. The compression coil spring 52 urges the push nut 54 and the stand 22 toward the vehicle width direction inside, and urges the clutch 72 toward the output gear 50 side (vehicle width direction outside).

Next, explanation follows regarding operation of the present exemplary embodiment.

In the drive device 20 of the deflector device 70 with the above configuration, the compression coil spring 52 urges the clutch 72 toward the output gear 50 side, so as to limit the coupling protrusions 72A of the clutch 72 from coming out of the coupling recesses 50B in the output gear 50. Thus, the deflector body 14 and the attachment 16 are coupled to the drive device 20 (including the motor 40).

When the motor 40 of the drive device 20 is driven forward, the output shaft 40B, the initial-stage worm 44, the initial-stage gear 48, and the output worm 46 are rotated, such that the output gear 50, the clutch 72, the stand 22, and the attachment 16 are rotated in the deployment direction A, and the deflector body 14 is rotated in the deployment direction A. As a result, the restricting plate 22D of the stand 22 (flange 22C) abuts the deployment direction A-side end face of the restricting hole 28D in the case body 28B, such that rotation of the stand 22 in the deployment direction A is restricted. Further rotation of the deflector body 14 in the deployment direction A is thereby restricted, and the deflector body 14 is disposed at the deployed position (the double-dotted dashed line position in FIG. 1).

On the other hand, when the motor 40 of the drive device 20 is driven in reverse, the output shaft 40B, the initial-stage worm 44, the initial-stage gear 48, and the output worm 46 are rotated, such that the output gear 50, the clutch 72, the stand 22, and the attachment 16 are rotated in the stowing direction B, and the deflector body 14 is rotated in the stowing direction B. As a result, the restricting plate 22D of the stand 22 (flange 22C) abuts the stowing direction B-side end face of the restricting hole 28D in the case body 28B, such that rotation of the stand 22 in the stowing direction B is restricted. Further rotation of the deflector body 14 in the stowing direction B is thereby restricted, and the deflector body 14 is disposed at the stowed position (the dashed line position in FIG. 1).

Figure 6B:
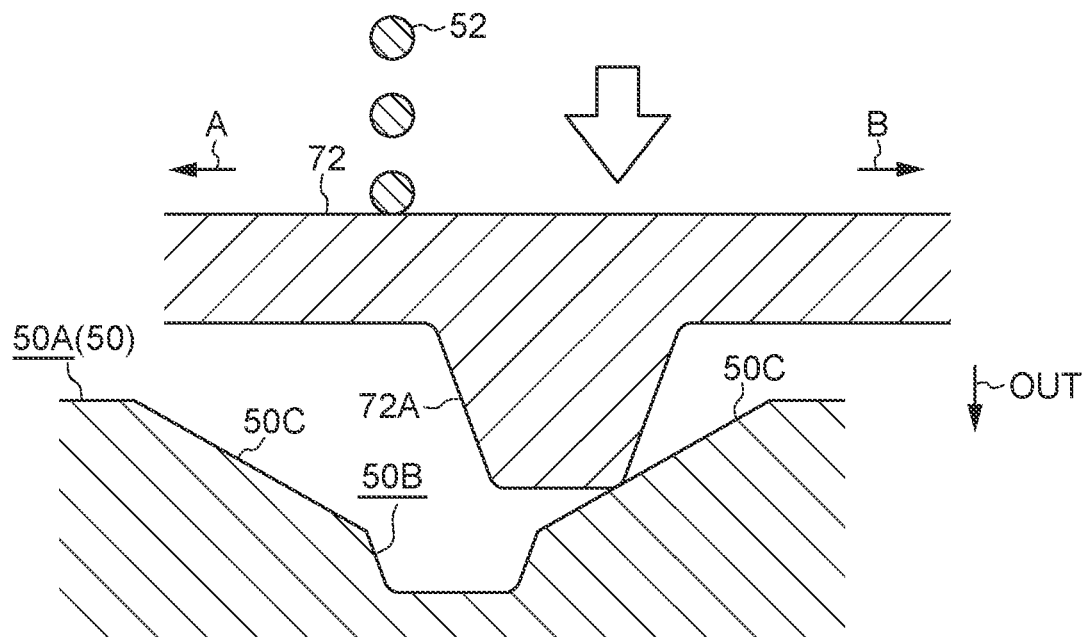
FIG. 6B is a cross-section illustrating the coupling mechanism of the deflector device according to the second exemplary embodiment of the present invention when a coupling has been released.

When the deflector body 14 is disposed at the deployed position, if an external force toward the upper side of a predetermined value or greater acts on the deflector section 14B of the deflector body 14 due to a protrusion on the road surface where the vehicle 12 is traveling, the coupling protrusions 72A of the clutch 72 come out from the coupling recesses 50B in the output gear 50 (the coupling of the deflector body 14 and the attachment 16 to the drive device 20 is released) against the urging force of the compression coil spring 52 (see FIG. 6B). The deflector body 14, the attachment 16, the stand 22, and the clutch 72 are thereby rotated in the stowing direction B against the urging force of the compression coil spring 52, and the deflector body 14, the attachment 16, and the drive device 20 are protected. Further rotation of the deflector body 14 in the stowing direction B is restricted inside the front end section of the vehicle body 12A.

Note that when such an external force acts on the deflector body 14 while at the deployed position such that the deflector body 14 is rotated in the stowing direction B against the urging force of the compression coil spring 52 as described above, even if rotation of the deflector body 14 in the stowing direction B is restricted inside the front end section of the vehicle body 12A, the coupling protrusions 72A of the clutch 72 are moved across the release faces 50C of the output gear 50 toward the coupling recess 50B side (the deflector body 14, the attachment 16, the stand 22, and the clutch 72 are rotated in the deployment direction A) by the urging force of the compression coil spring 52 when the external force acting on the deflector body 14 is released. The coupling protrusions 72A are thereby inserted into the coupling recesses 50B (the deflector body 14 is coupled to the drive device 20). This enables the deflector body 14 to be rotated (returned) to the deployed position from anywhere over the entire rotatable range in the stowing direction B by the urging force of the compression coil spring 52. Thus, the compression coil spring 52 is able to rotate the deflector body 14 to the deployed position (able to cause the deflector body 14 to couple to the drive device 20) in a suitable manner.

Furthermore, when an external force acts on the deflector body 14 while at the deployed position such that the deflector body 14 is rotated in the stowing direction B against the urging force of the compression coil spring 52, the deflector body 14 is rotated further toward the stowing direction B side (upper side) than the stowed position, and further rotation of the deflector body 14 in the stowing direction B is then restricted inside the front end section of the vehicle body 12A. This enables the deflector body 14 to be rotated (returned) to the deployed position from its position further toward the stowing direction B side than the stowed position by the urging force of the compression coil spring 52 when the external force acting on the deflector body 14 is released.

Moreover, in the drive device 20, the compression coil spring 52 spans between the push nut 54 and the clutch 72 of the stand 22, the compression coil spring 52 urges the stand 22 toward the vehicle width direction inside, and the case body 28B anchors the flange 22C of the stand 22 against movement toward the vehicle width direction inside. This enables movement of the deflector body 14 and the attachment 16 in the vehicle width direction relative to the drive device 20 (including the motor 40) to be limited, and enables rattling of the deflector body 14 against the drive device 20 to be suppressed.

Furthermore, the restricting plate 22D of the stand 22 (flange 22C) abuts either of the end faces of the restricting hole 28D in the case body 28B such that rotation of the deflector body 14 (stand 22) by the drive device 20 is restricted. Note that providing the restricting plate 22D to the flange 22C of the stand 22 enables the degrees of freedom for the configuration of the periphery of the stand 22 (flange 22C) to be increased.

Moreover, the sealing ring 30 seals between the sealing tube 16C of the attachment 16 and the support tube 28A of the case 28 so as to limit water ingress into the support tube 28A. This enables water ingress into the case 28 to be limited, and also enables water ingress into the motor 40 located between the case 28 and the cover 36 to be limited.

Furthermore, the second ring 38 seals between the vehicle width direction inside end portion of the case body 28B and the vehicle width direction outside end portion of the cover 36 so as to limit water ingress into the space between the case 28 and the cover 36. This enables water ingress into the motor 40 located between the case 28 and the cover 36 to be limited.

Note that in the present exemplary embodiment, the coupling protrusions 72A are provided to the clutch 72, and the coupling recesses 50B and the release faces 50C are provided to the output gear 50.

However, configuration may be such that the coupling recesses 50B and the release faces 50C are provided to the clutch 72, and the coupling protrusions 72A are provided to the output gear 50.

Alternatively, configuration may be such that the coupling protrusions 72A are provided to one of the stand 22 (flange 22C) or the case 28 (bottom wall of the case body 28B), and the coupling recesses 50B and the release faces 50C are provided to the other of the stand 22 (flange 22C) or the case 28 (bottom wall of the case body 28B). In such cases, the clutch 72 is not provided, the compression coil spring 52 spans between the push nut 54 and the output gear 50 of the stand 22, and the stand 22 and the output gear 50 are capable of rotating integrally with one another.

Moreover, in the first exemplary embodiment and the second exemplary embodiment, the attachment 16 is fixed to the deflector body 14, and the case body 28B and the cover 36 (vehicle body 12A side) of the drive device 20 are fixed to the vehicle body 12A. However, configuration may be such that the attachment 16 (vehicle body 12A side) is fixed to the vehicle body 12A, and the case body 28B and the cover 36 are fixed to the deflector body 14 of the drive device 20.

What is claimed is:

1. A deflector device, comprising:
 a deflector body configured to be deployed at a front side of a front wheel of a vehicle by being rotated in a deployment direction so as to suppress airflow toward the front wheel, and configured to be stowed in a vehicle body by being rotated in a stowing direction;
 a rotator configured to cause the deflector body to rotate due to the deflector body being coupled to a vehicle body side, and configured to permit rotation of the deflector body in the stowing direction due to an external force acting on the deflector body so as to release coupling of the deflector body to the vehicle body side;
 an urger configured to couple the deflector body to the vehicle body side from anywhere over an entire rotatable range of the deflector body in the stowing direction by urging the deflector body in the deployment direction when the coupling of the deflector body to the vehicle body side has been released; and
 an urging section configured to urge between a deflector body side and the vehicle body side so as to limit movement of the deflector body with respect to the vehicle body side.

2. The deflector device of claim 1, wherein the deflector body is rotatable from a deployed position to a position further in the stowing direction than a stowed position.

3. A deflector device comprising:
- a deflector body configured to be deployed at a front side of a front wheel of a vehicle by being rotated in a deployment direction so as to suppress airflow toward the front wheel, and configured to be stowed in a vehicle body by being rotated in a stowing direction;
- a rotator configured to cause the deflector body to rotate due to the deflector body being coupled to a vehicle body side, and configured to permit rotation of the deflector body in the stowing direction due to an external force acting on the deflector body so as to release coupling of the deflector body to the vehicle body side;
- an urger configured to couple the deflector body to the vehicle body side from anywhere over an entire rotatable range of the deflector body in the stowing direction by urging the deflector body in the deployment direction when the coupling of the deflector body to the vehicle body side has been released; and
- a first restricting section that is provided at a rotation shaft of the deflector body, and is configured to restrict rotation of the deflector body by the rotator.

4. A deflector device, comprising:
- a deflector body configured to be deployed at a front side of a front wheel of a vehicle by being rotated in a deployment direction so as to suppress airflow toward the front wheel, and configured to be stowed in a vehicle body by being rotated in a stowing direction;
- a rotator configured to cause the deflector body to rotate due to the deflector body being coupled to a vehicle body side, and configured to permit rotation of the deflector body in the stowing direction due to an external force acting on the deflector body so as to release coupling of the deflector body to the vehicle body side;
- an urger configured to couple the deflector body to the vehicle body side from anywhere over an entire rotatable range of the deflector body in the stowing direction by urging the deflector body in the deployment direction when the coupling of the deflector body to the vehicle body side has been released; and
- a second restricting section that is provided at a rotation shaft of the deflector body, and is configured to restrict rotation of the deflector body by releasing the coupling of the deflector body to the vehicle body side.

5. A deflector device, comprising:
- a deflector body configured to be deployed at a front side of a front wheel of a vehicle by being rotated in a deployment direction so as to suppress airflow toward the front wheel, and configured to be stowed in a vehicle body by being rotated in a stowing direction;
- a rotator configured to cause the deflector body to rotate due to the deflector body being coupled to a vehicle body side, and configured to permit rotation of the deflector body in the stowing direction due to an external force acting on the deflector body so as to release coupling of the deflector body to the vehicle body side;
- an urger configured to couple the deflector body to the vehicle body side from anywhere over an entire rotatable range of the deflector body in the stowing direction by urging the deflector body in the deployment direction when the coupling of the deflector body to the vehicle body side has been released; and
- a seal section configured to seal between a deflector body side and the vehicle body side.

6. A deflector device, comprising:
- a deflector body configured to be deployed at a front side of a front wheel of a vehicle by being rotated in a deployment direction so as to suppress airflow toward the front wheel, and configured to be stowed in a vehicle body by being rotated in a stowing direction;
- a rotator configured to cause the deflector body to rotate due to the deflector body being coupled to a vehicle body side, and configured to permit rotation of the deflector body in the stowing direction due to an external force acting on the deflector body so as to release coupling of the deflector body to the vehicle body side; and
- an urger configured to couple the deflector body to the vehicle body side from anywhere over an entire rotatable range of the deflector body in the stowing direction by urging the deflector body in the deployment direction when the coupling of the deflector body to the vehicle body side has been released,
- wherein rotation of the deflector body by an urging force of the urger is limited by the vehicle body side to couple the deflector body to the vehicle body side.

7. The deflector device of claim 1, wherein the urger is coupled to the deflector body in a rotation direction of the deflector body.

8. A deflector device, comprising:
- a deflector body configured to be deployed at a front side of a front wheel of a vehicle by being rotated in a deployment direction so as to suppress airflow toward the front wheel, and configured to be stowed in a vehicle body by being rotated in a stowing direction;
- a rotator configured to cause the deflector body to rotate due to the deflector body being coupled to a vehicle body side, and configured to permit rotation of the deflector body in the stowing direction due to an external force acting on the deflector body so as to release coupling of the deflector body to the vehicle body side; and
- an urger configured to couple the deflector body to the vehicle body side from anywhere over an entire rotatable range of the deflector body in the stowing direction by urging the deflector body in the deployment direction when the coupling of the deflector body to the vehicle body side has been released,
- wherein release of the coupling of the deflector body to the vehicle body side permits rotation of the deflector body in the deployment direction, and
- wherein the deflector body which is permitted to rotate in the deployment direction is urged by the urger in the stowing direction to couple the deflector body to the vehicle body side.

* * * * *